United States Patent
Lee et al.

(10) Patent No.: US 12,394,835 B2
(45) Date of Patent: Aug. 19, 2025

(54) BATTERY MODULE AND BATTERY PACK INCLUDING THE SAME

(71) Applicant: LG ENERGY SOLUTION, LTD., Seoul (KR)

(72) Inventors: Changhun Lee, Daejeon (KR); Junyeob Seong, Daejeon (KR); Jonghwa Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 640 days.

(21) Appl. No.: 17/772,437

(22) PCT Filed: Mar. 9, 2021

(86) PCT No.: PCT/KR2021/002918
§ 371 (c)(1),
(2) Date: Apr. 27, 2022

(87) PCT Pub. No.: WO2021/221296
PCT Pub. Date: Nov. 4, 2021

(65) Prior Publication Data
US 2022/0376327 A1   Nov. 24, 2022

(30) Foreign Application Priority Data
Apr. 29, 2020 (KR) .................. 10-2020-0052266

(51) Int. Cl.
*H01M 10/6556* (2014.01)
*H01M 10/613* (2014.01)
*H01M 10/6551* (2014.01)
*H01M 50/211* (2021.01)

(52) U.S. Cl.
CPC ..... *H01M 10/6556* (2015.04); *H01M 10/613* (2015.04); *H01M 10/6551* (2015.04); *H01M 50/211* (2021.01); *H01M 2220/20* (2013.01)

(58) Field of Classification Search
CPC .......... H01M 10/6556; H01M 10/613; H01M 10/6551; H01M 50/211; H01M 2220/20; H01M 50/209; H01M 10/6567; H01M 50/204; H01M 10/623; H01M 10/625; H01M 2220/30; H01M 50/20; Y02E 60/10; Y02T 10/70
See application file for complete search history.

(56) References Cited

U.S. PATENT DOCUMENTS

| | | |
|---|---|---|
| 2012/0214046 A1 | 8/2012 | Lim |
| 2013/0189559 A1* | 7/2013 | Giere ................. H01M 10/655 429/120 |
| 2013/0216872 A1 | 8/2013 | Fuhr et al. |
| 2015/0349394 A1 | 12/2015 | Hayashida et al. |
| 2016/0149180 A1* | 5/2016 | Tokoo ................. H01M 10/613 429/154 |
| 2018/0366784 A1 | 12/2018 | Kim et al. |
| 2019/0074562 A1 | 3/2019 | Kim et al. |
| 2019/0173064 A1 | 6/2019 | Lee et al. |
| 2019/0245168 A1* | 8/2019 | Qin ..................... H01M 50/291 |
| 2020/0036062 A1* | 1/2020 | Hirsch ................. H01M 50/24 |
| 2020/0067155 A1* | 2/2020 | Hwang ............. H01M 10/6551 |
| 2020/0119321 A1 | 4/2020 | Hirose et al. |
| 2020/0176838 A1* | 6/2020 | Kopp ................. H01M 10/613 |
| 2020/0388805 A1 | 12/2020 | Yoo et al. |
| 2021/0028518 A1* | 1/2021 | Jeon ................. H01M 10/6554 |
| 2021/0249710 A1 | 8/2021 | Kimura et al. |

FOREIGN PATENT DOCUMENTS

| | | | |
|---|---|---|---|
| CN | 108028336 A | 5/2018 | |
| DE | 10 2019 122 340 A1 | 2/2020 | |
| JP | 2015-138589 A | 7/2015 | |
| JP | 2018-527705 A | 9/2018 | |
| JP | 2020-61291 A | 4/2020 | |
| KR | 10-2012-0096886 A | 8/2012 | |
| KR | 10-2017-0027549 A | 3/2017 | |
| KR | 10-2017-0084699 A | 7/2017 | |
| KR | 10-2017-0107798 A | 9/2017 | |
| KR | 10-2050025 B1 | 1/2020 | |
| KR | 10-2020-0030964 A | 3/2020 | |
| WO | WO-2012133709 A1 * | 10/2012 | ......... H01M 10/613 |
| WO | WO 2014/077578 A1 | 5/2014 | |
| WO | WO 2018/080010 A1 | 5/2018 | |
| WO | WO 2020/027299 A1 | 2/2020 | |

OTHER PUBLICATIONS

Extended European Search Report for European Application No. 21795315.7, dated Jun. 11, 2024.
International Search Report for PCT/KR2021/002918 mailed on Jul. 5, 2021.

* cited by examiner

*Primary Examiner* — Muhammad S Siddiquee
(74) *Attorney, Agent, or Firm* — Birch, Stewart, Kolasch & Birch, LLP (57) ABSTRACT

A battery module includes a battery cell stack in which a plurality of battery cells are stacked; a module frame accommodating the battery cell stack; an end plate positioned on a front surface and a rear surface of the battery cell stack; and a heat sink positioned under a bottom portion of the module frame. The bottom portion constitutes the upper plate of the heat sink. The module frame includes a first module frame protruded part and a second module frame protruded part formed by protruding a part of the bottom portion, and the first module frame protruded part and the second module frame protruded part are positioned to be spaced apart from each other. A welding part where the end plate and the module frame are welded is positioned between the first module frame protruded part and the second module frame protruded part.

11 Claims, 8 Drawing Sheets

BATTERY MODULE AND BATTERY PACK INCLUDING THE SAME

BACKGROUND OF THE INVENTION (a) Field of the Invention

Technical Field

CROSS-REFERENCE TO RELATED APPLICATION

This application claims priority to and the benefit of Korean Patent Application No. 10-2020-0052266 filed in the Korean Intellectual Property Office on Apr. 29, 2020, the entire contents of which are incorporated herein by reference.

The present invention relates to a battery module and a battery pack including the same, and more specifically, to a battery module with improved structural stability and a battery pack including the same.

Background Art

In modern society, in accordance with the daily use of portable devices such as a mobile phone, a laptop computer, a camcorder, a digital camera, and the like, technologies of a field related to the portable devices have been actively developed. In addition, as a rechargeable battery capable of being charged and discharged is used as a power source of an electric vehicle (EV), a hybrid electric vehicle (HEV), and a plug-in hybrid electric vehicle (P-HEV) as a method for solving air pollution of conventional gasoline vehicles using a fossil fuel, a necessity for the development of the rechargeable battery is increasing.

Currently commercially available rechargeable batteries include a nickel cadmium battery, a nickel hydrogen battery, a nickel zinc battery, and a lithium rechargeable battery, and among them, the lithium rechargeable battery is spotlighted for its merits such as free charge and discharge, a very low self-discharge rate, and a high energy density because a memory effect hardly occurs compared to the nickel-based rechargeable battery.

These lithium rechargeable batteries mainly use a lithium-based oxide and a carbon material as a positive active material and a negative active material, respectively. The lithium rechargeable battery has an electrode assembly in which a positive electrode plate and a negative electrode plate coated with these positive and negative active materials are respectively disposed via a separator therebetween, and a battery case that seals and houses the electrode assembly together with an electrolyte solution.

In general, the lithium rechargeable battery may be classified into a can-type rechargeable battery in which the electrode assembly is built in a metal can and a pouch-type rechargeable battery in which the electrode assembly is built in a pouch of an aluminum laminate sheet according to the shape of the exterior material.

In the case of the rechargeable battery used in small devices, two or three battery cells are disposed, but in the case of the rechargeable battery used in a medium or large device such as a car, a battery module in which a plurality of battery cells are electrically connected to each other is used. In this battery module, a plurality of battery cells is coupled in series or in parallel to form a battery cell stack, thereby improving capacity and output. In addition, at least one battery module may be mounted together with various control and protection systems such as a battery management system (BMS) and a cooling system to form a battery pack.

For the rechargeable battery, when at a higher than appropriate temperature, the performance of the rechargeable battery may be deteriorated, and in severe cases, there is also a risk of explosion or ignition. Particularly, in the battery module or the battery pack having a plurality of rechargeable batteries, that is, the battery cell, heat from a plurality of battery cells is summed in a narrow space, so that the temperature may rise more rapidly and severely. In other words, in the case of a battery module in which a plurality of battery cells are stacked and a battery pack in which such a battery module is mounted, high output may be obtained, but it is not easy to remove heat generated in the battery cells during charging and discharging. If the heat dissipation of the battery cell is not performed properly, the deterioration of the battery cell is accelerated, the cycle-life is shortened, and the possibility of explosion or ignition increases.

Moreover, in the case of the battery module included in a vehicle battery pack, it is frequently exposed to direct sunlight and may be subjected to high temperature conditions such as in summer or desert areas.

Therefore, when configuring the battery module or the battery pack, it is very important to secure stable and effective cooling performance.

Figure 1:
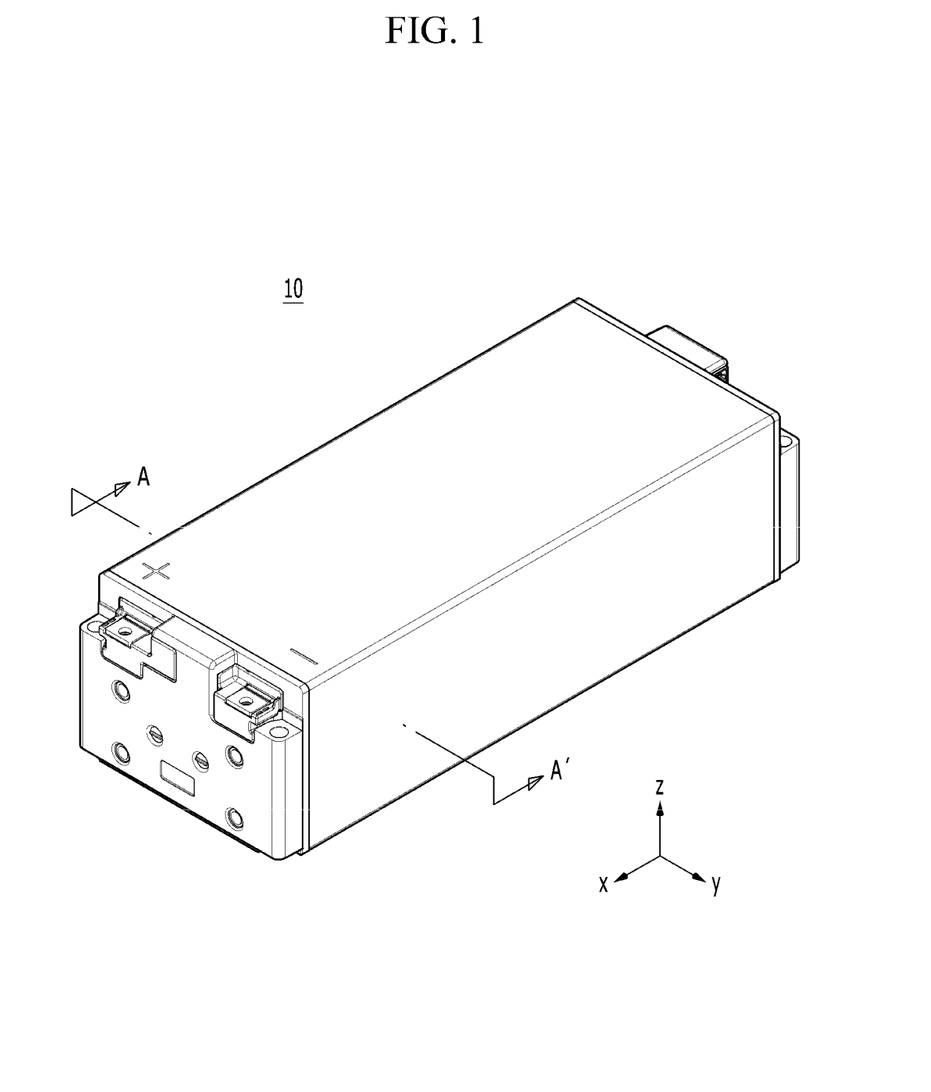
FIG. 1 is a perspective view of a conventional battery module.
Figure 2:
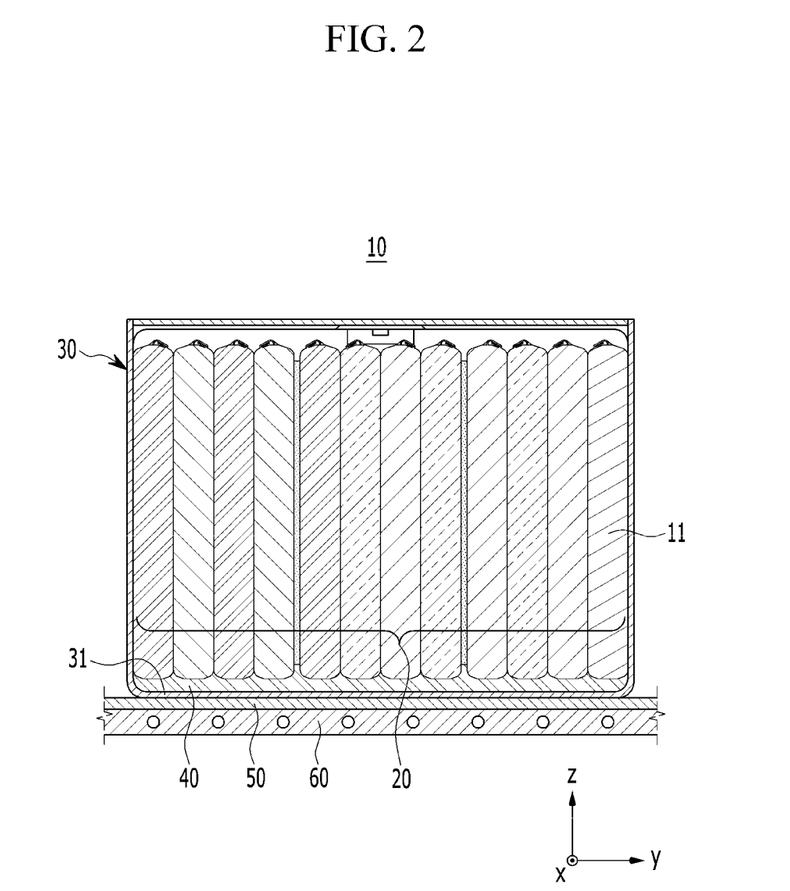
FIG. 2 is a cross-sectional view taken along a cutting line 2-2 in FIG. 1.

FIG. 1 is a perspective view of a conventional battery module, an FIG. 2 is a cross-sectional view taken along a cutting line 2-2 in FIG. 1. Particularly, FIG. 2 further shows a heat transfer member and a heat sink positioned below the battery module.

Referring to FIG. 1 and FIG. 2, in a conventional battery module 10, a plurality of battery cells 11 are stacked to form a battery cell stack 20, and the battery cell stack 20 is accommodated in the module frame 30.

As described above, since the battery module 10 includes a plurality of battery cells 11, a large amount of heat is generated during the charging and discharging. As a cooling means, the battery module 10 may include a thermal conductive resin layer 40 positioned between the battery cell stack 20 and the bottom portion 31 of the module frame 30. Also, when the battery module 10 is mounted in the pack frame to form the battery pack, a heat transfer member 50 and a heat sink 60 may be sequentially positioned under the battery module 10. The heat transfer member 50 may be a heat dissipation pad, and the heat sink 60 may have a refrigerant flow path formed therein.

The heat generated from the battery cell 11 is sequentially transferred to the outside of the battery module 10 through the thermal conductive resin layer 40, the bottom portion 31 of the module frame 30, the heat transfer member 50, and the heat sink 60.

However, in the case of the conventional battery module 10, the heat transfer path is complicated as described above, so it is difficult to effectively transfer the heat generated from the battery cell 11. The module frame 30 itself may deteriorate the heat conduction characteristic, and a fine air layer such as an air gap that may be respectively formed between the module frame 30, the heat transfer member 50, and the heat sink 60 also may be a contributing factor deteriorating the heat conduction characteristic.

As other demands such as a down-sizing and a capacity increase are continuing for battery modules, it is substantially necessary to develop the battery module that may satisfy these various requirements while improving the cooling performance.

DISCLOSURE

Technical Problem

The task to be solved by the present invention is to provide a battery module with improved structural stability and a battery pack including the same.

However, the objective of the present invention is not limited to the aforementioned one, and may be extended in various ways within the spirit and scope of the present invention.

Technical Solution

A battery module according to an exemplary embodiment of the present invention includes: a battery cell stack in which a plurality of battery cells are stacked; a module frame accommodating the battery cell stack; an end plate positioned on a front surface and a rear surface of the battery cell stack; and a heat sink positioned under a bottom portion of the module frame of the module frame. The bottom portion constitutes an upper plate of the heat sink. The module frame includes a first module frame protruded part and a second module frame protruded part extending from the bottom portion of the module frame, and the first module frame protruded part and the second module frame protruded part are positioned to be spaced apart from each other. A welding part where the end plate and the module frame are welded is positioned between the first module frame protruded part and the second module frame protruded part.

The welding part may be formed where the lower edge of the end plate and the bottom portion are in contact.

The heat sink may include a first heat sink protruded part and a second heat sink protruded part extending from the heat sink and respectively overlapping the first module frame protruded part and the second module frame protruded part.

A module frame mounting hole may be formed in each of the first module frame protruded part and the second module frame protruded part.

A heat sink mounting hole may be formed in each of the first heat sink protruded part and the second heat sink protruded part.

The module frame mounting hole and the heat sink mounting hole may be positioned to correspond to each other.

The heat sink and the bottom portion may form a flow path of a refrigerant, and the bottom portion may be in contact with the refrigerant.

The heat sink may include an inflow hole for inflow of the refrigerant and an outflow hole for exhaust of the refrigerant.

The heat sink may include a lower plate joined with the bottom portion and a depressed portion depressed into the lower side.

Advantageous Effects

According to exemplary embodiments of the present invention, it is possible to provide the battery module with improved cooling performance through the integrated structure of the module frame and the heat sink.

In addition, it is possible to reduce the cost and to increase the spatial utility by removing the unnecessary cooling structure, thereby increasing the capacity or the output of the battery module.

In addition, in a large area module with an increased area, a welding structure may be formed in a structurally weak part, such that structural rigidity may be increased.

The effects of the present invention are not limited to the effects mentioned above, and other effects not mentioned will be clearly understood by a person of ordinary skill in the art from the description of the claimed range.

MODE FOR INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Descriptions of parts not related to the present invention are omitted, and like reference numerals designate like elements throughout the specification.

Further, since sizes and thicknesses of constituent members shown in the accompanying drawings are arbitrarily given for better understanding and ease of description, the present invention is not limited to the illustrated sizes and thicknesses. In the drawings, the thickness of layers, films, panels, regions, etc., are exaggerated for clarity. In the drawings, for better understanding and ease of description, the thicknesses of some layers and areas are exaggerated.

Also, it will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise", and variations such as "comprises" or "comprising", will be understood to imply the inclusion of stated elements but not the exclusion of any other elements.

Further, in the specification, the phrase "on a plane" means when an object portion is viewed from above, and the phrase "on a cross-section" means when a cross-section taken by vertically cutting an object portion is viewed from the side.

Figure 3:
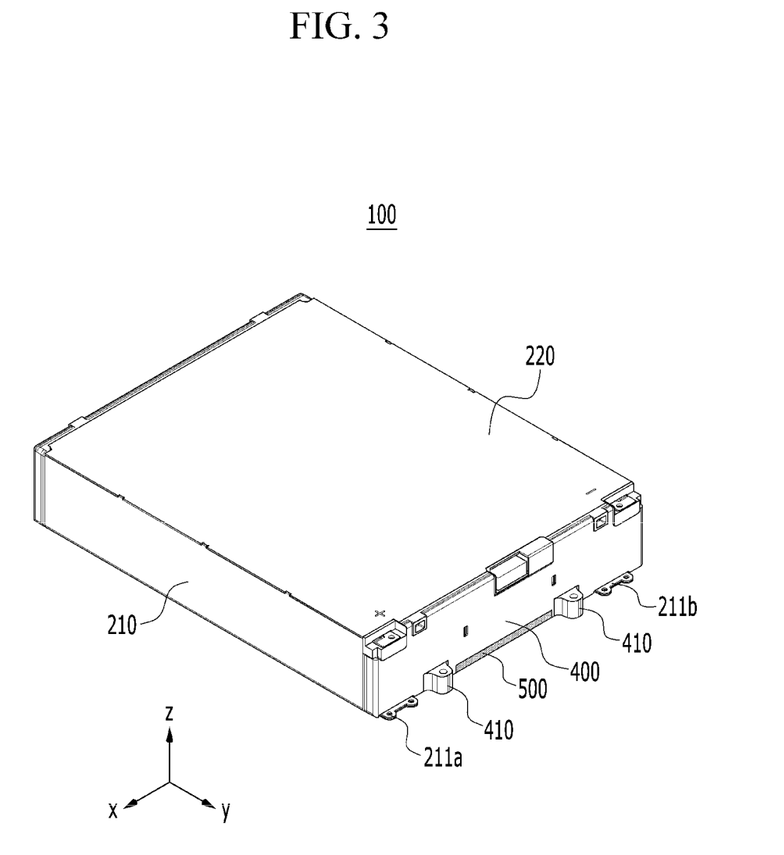
FIG. 3 is a perspective view of a battery module according to an exemplary embodiment of the present invention.
Figure 4:
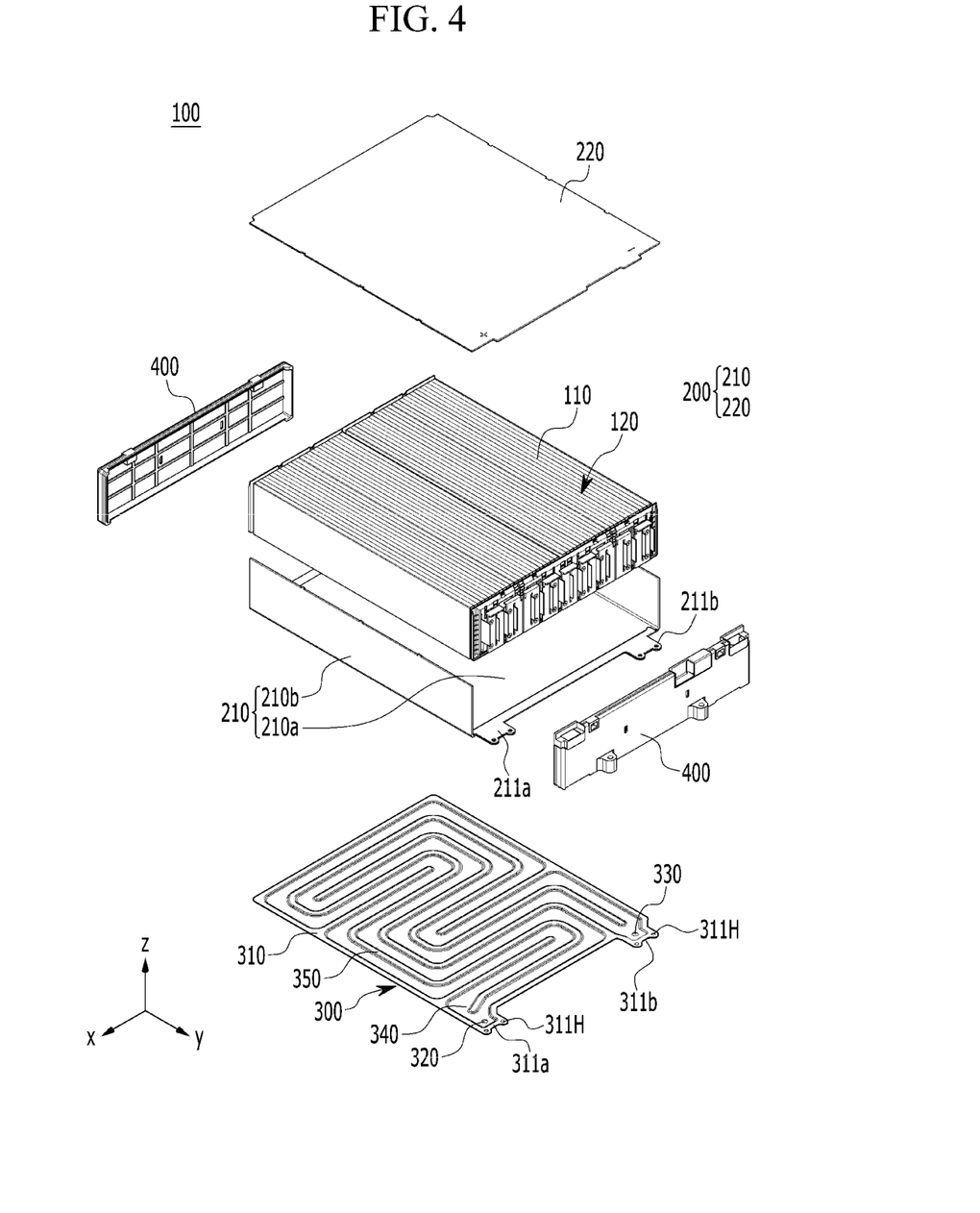
FIG. 4 is an exploded perspective view of a battery module of FIG. 3.
Figure 5:
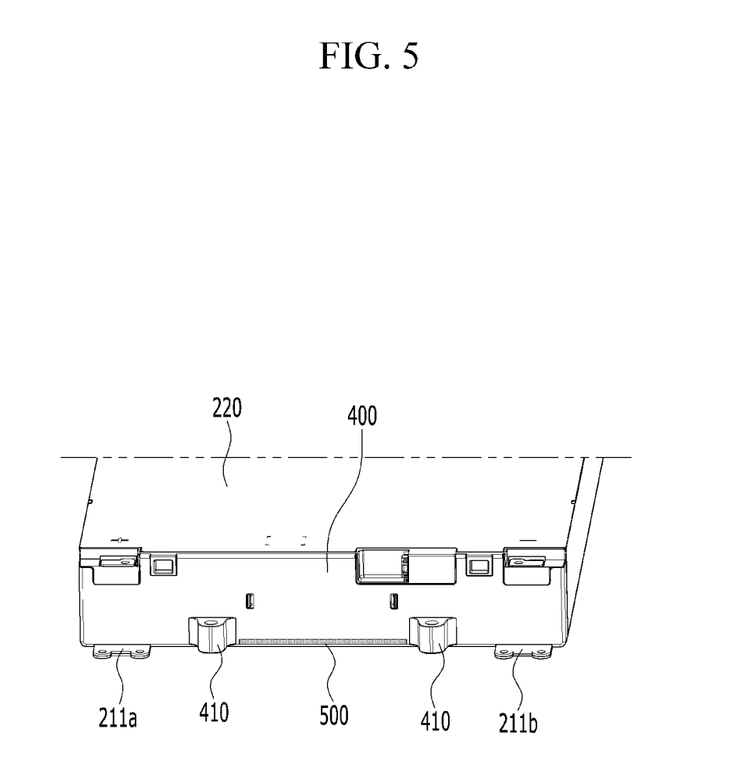
FIG. 5 is a partial perspective view looking at a battery module of FIG. 3 at different angles.

FIG. 3 is a perspective view of a battery module according to an exemplary embodiment of the present invention. FIG. 4 is an exploded perspective view of a battery module of FIG. 3. FIG. 5 is a partial perspective view looking at a battery module of FIG. 3 at different angles.

Referring to FIG. 3 to FIG. 5, a battery module 100 according to an exemplary embodiment of the present invention includes a battery cell stack 120 in which a plurality of battery cells 110 are stacked, a module frame 200 accommodating the battery cell stack 120, an end plate 400 positioned respectively at the front surface and the rear surface of the battery cell stack 120, and a heat sink 300 positioned under the bottom portion 210a of the module frame 200.

The battery cell 110 may be a pouch-type battery cell. Such a pouch-type battery cell may be formed by accommodating the electrode assembly into a pouch case of a laminate sheet including a resin layer and a metal layer, and then thermally fusing the exterior circumference of the pouch case. In this case, the battery cell 110 may be formed in a rectangular sheet-type structure.

The battery cells 110 may be configured in plurality, and a plurality of battery cells 110 are stacked to be electrically connected to each other, thereby forming the battery cell stack 120. Particularly, as shown in FIG. 4, a plurality of battery cells 110 may be stacked along the direction parallel to an x-axis.

The battery cell stack 120 according to the present exemplary embodiment may be a large area module in which the number of battery cells 110 is greater than that of the prior art. Specifically, 32 to 48 battery cells 110 per battery module 100 may be included. In the case of such a large area module, the horizontal direction length of the battery module becomes longer. Here, the horizontal direction length may mean a length in the direction in which the battery cells 110 are stacked, that is, in the direction parallel to the x-axis.

The module frame 200 for accommodating the battery cell stack 120 may include an upper cover 220 and a U-shaped frame 210.

The U-shaped frame 210 may include a bottom portion 210a and two side portions 210b extending upward from both ends of the bottom portion 210a. The bottom portion 210a may cover the lower surface (a direction opposite to the z-axis) of the battery cell stack 120, and the side portion 210b may cover both side surfaces (a direction opposite to the x-axis direction) of the battery cell stack 120.

The upper cover 220 may be formed in a single plate-shaped structure surrounding the upper surface (the z-axis direction) except for the lower surface and the both side surfaces covered by the U-shaped frame 210. The upper cover 220 and the U-shaped frame 210 are combined by welding or the like in the state where the corresponding corner portions are in contact with each other, thereby forming a structure that covers the battery cell stack 120 horizontally and vertically. It is possible to physically protect the battery cell stack 120 through the upper cover 220 and the U-shaped frame 210. To this end, the upper cover 220 and the U-shaped frame 210 may include a metal material having a predetermined strength.

On the other hand, although not specifically shown, the module frame 200 according to an exemplary variation may be a mono frame in the form of a metal plate in which the upper surface, the lower surface, and both side surfaces are integrated. That is, it is not a structure in which the U-shaped frame 210 and the upper cover 220 are mutually coupled, but may be manufactured by extrusion molding, and thus the upper surface, the lower surface, and both side surfaces may be integrated.

The end plate 400 may be positioned on the front surface (the y-axis direction) and the rear surface (the y-axis opposite direction) of the battery cell stack 120 to cover the battery cell stack 120. This end plate 400 may physically protect the battery cell stack 120 and other electronic devices from external impact. The end plate 400 may also include a mounting portion 410. The mounting portion 410 may have a structure protruded from one surface of the end plate 400, and a through hole may be formed. The battery module 100 may be mounted and fixed to the pack frame through the mounting portion 410 to form the battery pack.

Meanwhile, although not specifically illustrated, a bus bar frame on which a bus bar is mounted and an insulating cover for electrical insulation may be positioned between the battery cell stack 120 and the end plate 400.

Hereinafter, the structure of the heat sink is described in detail with reference to FIG. 6 and FIG. 7.

Figure 6:
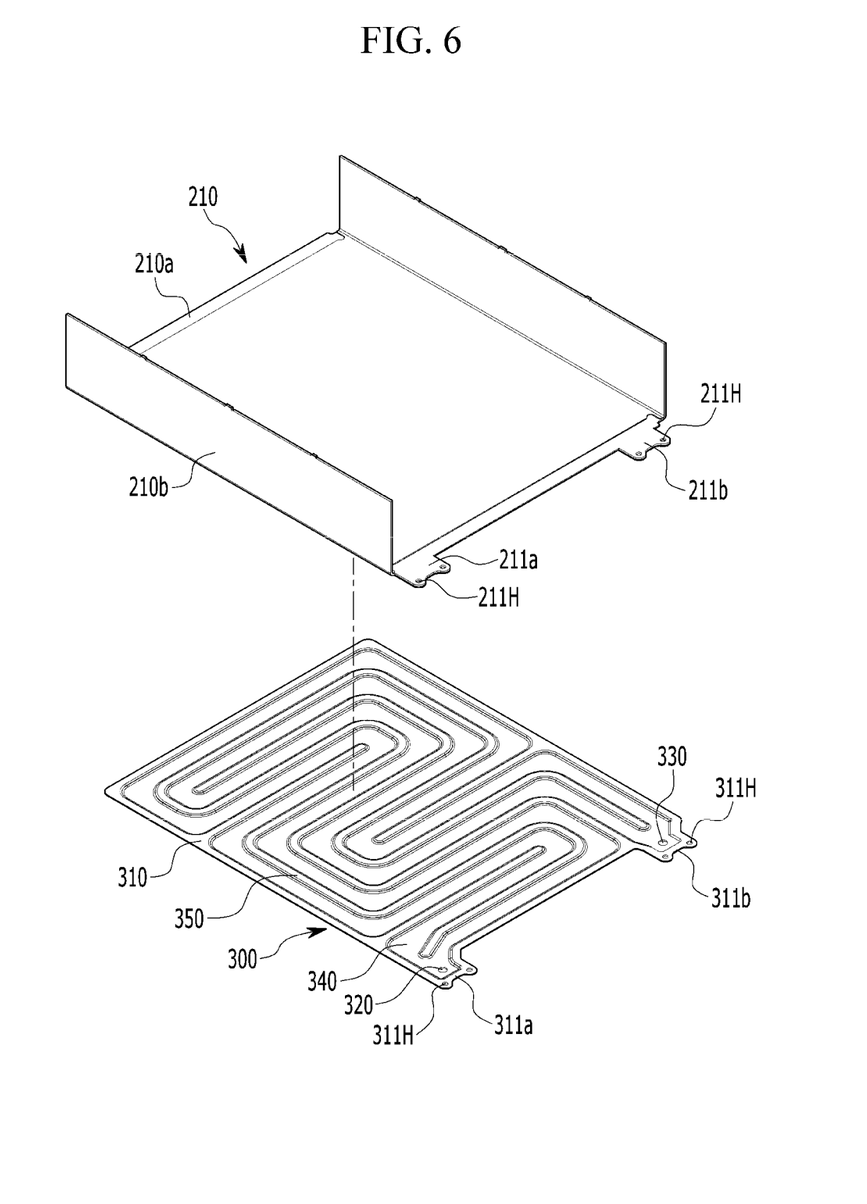
FIG. 6 is a perspective view showing a U-shaped frame and a heat sink included in a battery module of FIG. 4.
Figure 7:
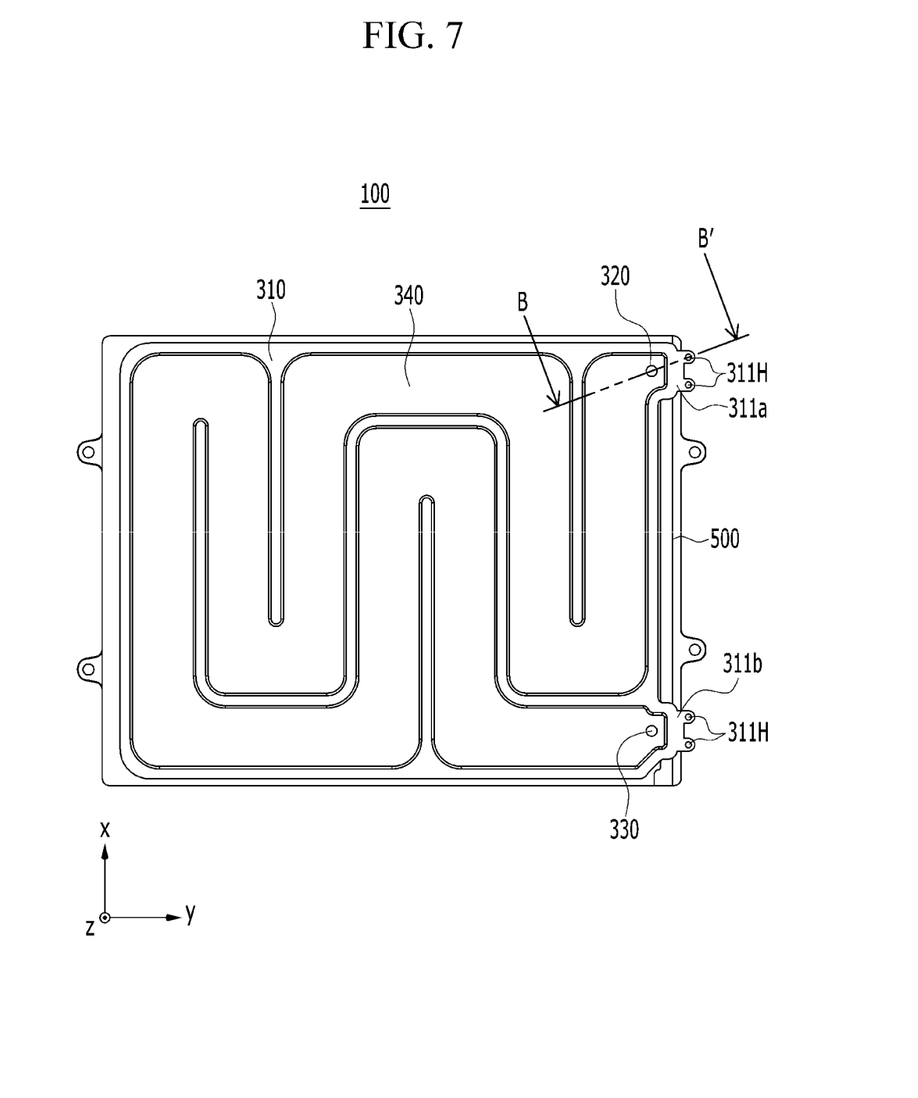
FIG. 7 is a top plan view looking at a battery module of FIG. 3 in a z-axis direction in an xy plane.

FIG. 6 is a perspective view showing a U-shaped frame and a heat sink included in a battery module of FIG. 4, and FIG. 7 is a top plan view looking at a battery module of FIG. 3 in a z-axis direction in an xy plane. That is, FIG. 7 is a top plan view of the battery module of FIG. 3 from below.

Referring to FIG. 4, FIG. 6, and FIG. 7, the bottom portion 210a constitutes an upper plate of the heat sink 300, and the heat sink 300 and the bottom portion 210a of the module frame 200 may form a flow path of a refrigerant.

Specifically, the heat sink 300 may include a lower plate 310 that forms the skeleton of the heat sink 300 and is joined to the bottom portion 210a of the module frame 200 by the welding or the like, and a depressed portion 340 that is a path through which the refrigerant flows.

The depressed portion 340 of the heat sink 300 corresponds to a portion in which the lower plate 310 is depressed downward. The depressed portion 340 may be a U-shaped tube with a cross-section cut vertically in the xz plane based on the direction in which the refrigerant flow path extends, and the bottom portion 210a may be positioned on the opened upper side of the U-shaped tube. As the heat sink 300 is in contact with the bottom portion 210a, the space between the depressed portion 340 and the bottom portion 210a becomes a region through which the refrigerant flows, that is, the flow path of the refrigerant. Accordingly, the bottom portion 210a of the module frame 200 may be in contact with the refrigerant.

There is no particular limitation on the manufacturing method of the depressed portion 340 of the heat sink 300, but by providing a structure in which a depression is formed with respect to the plate-shaped heat sink 300, the U-shaped depressed portion 340 of which the upper side is opened may be formed.

On the other hand, although not shown, a thermal conductive resin layer including a thermal resin may be positioned between the bottom portion 210a of the module frame 200 of FIG. 4 and the battery cell stack 120. The thermal conductive resin layer may be formed by coating the thermal resin to the bottom portion 210a and curing the coated thermal resin.

The thermal resin may include a thermal conductive adhesive material, specifically, at least one of a silicone material, a urethane material, and an acrylic material. The thermal resin may be liquid during the coating, but is cured after the coating, thereby serving to fix at least one battery cell 110 constituting the battery cell stack 120. In addition, it has excellent thermal conductive characteristics, so that the heat generated by the battery cell 110 may be quickly transferred to the lower side of the battery module.

In the conventional battery module 10 shown in FIG. 2, the heat generated by the battery cell 11 is transferred to the outside of the battery module 10 while sequentially passing through the thermal conductive resin layer 40, the bottom portion 31 of the module frame 30, the heat transfer member 50, and the refrigerant of the heat sink 60. Also, the refrigerant flow path of the heat sink 60 is positioned inside the heat sink 60.

On the other hand, the battery module 100 according to the present exemplary embodiment implements a cooling integrated structure of the heat sink 300 with the module frame 200, thereby further improving cooling performance. Since the bottom portion 210a of the module frame 200 serves to correspond to the upper plate of the heat sink 300, the cooling integrated structure may be implemented. The cooling efficiency increases depending on the direct cooling, and a space utilization rate of the battery module 100 and the battery pack 1000 to which the battery module 100 is mounted can be further improved through the structure in which the heat sink 300 is integrated with the bottom portion 210a of the module frame 200.

Specifically, the heat generated in the battery cell 110 may be transferred to the outside of the battery module 100 through the thermal conductive resin layer (not shown) positioned between the battery cell stack 120 and the bottom portion 210a of the module frame 200, and the refrigerant. By removing a conventional unnecessary cooling structure, the heat transfer path is simplified and each air gap between the layers may be reduced, so the cooling efficiency or performance may be increased. Particularly, the bottom portion 210a is composed of the upper plate of the heat sink 300, and since the bottom portion 210a is in direct contact with the refrigerant, there is a merit that more direct cooling through the refrigerant is allowed. Conventionally, as shown in FIG. 2, the upper configuration of the heat transfer member 50 and the heat sink 60 is positioned between the bottom portion 31 and the refrigerant, which may decrease the cooling efficiency.

In addition, by removing the unnecessary cooling structure, the height of the battery module 100 is reduced, making it possible to reduce costs and increase spatial utility. Furthermore, since the battery module 100 may be compactly disposed, the capacity or output of the battery pack 1000 including a plurality of the battery modules 100 may be increased.

On the other hand, the bottom portion 210a of the module frame 200 may be joined to the lower plate 310 portion in which the depressed portion 340 of the heat sink 300 is not formed through welding. In the present exemplary embodiment, through the integrated cooling structure of the bottom portion 210a of the module frame 200 and the heat sink 300, in addition to improving the cooling performance described above, it may have the effect of supporting the load of the battery cell stack 120 accommodated in the module frame 200 and reinforcing the rigidity of the battery module 100. In addition, the lower plate 310 and the bottom portion 210a of the module frame 200 are sealed through welding, etc., so that the refrigerant may flow from the depressed portion 340 formed inside the lower plate 310 without leakage.

For effective cooling, as shown in FIG. 6 and FIG. 7, it is preferable that the depressed portion 340 is formed over the entire area corresponding to the bottom portion 210a of the module frame 200. For this, the depressed portion 340 may be bent at least once and lead from one side to the other. In particular, the depressed portion 340 is preferably bent several times in order to form the depressed portion 340 over the entire area corresponding to the bottom portion 210a of the module frame 200. As the refrigerant moves from the start point to the end point of the refrigerant flow path formed over the entire area corresponding to the bottom portion 210a of the module frame 200, efficient cooling of the entire area of the battery cell stack 120 may be achieved.

On the other hand, the refrigerant is a medium for the cooling, and there is no particular limitation, but may be cooling water.

Meanwhile, the heat sink 300 according to the present exemplary embodiment may include an inflow hole 320 for inflow of the refrigerant and an outflow hole 330 for outflow of the refrigerant. Specifically, when the depressed portion 340 of the heat sink 300 is connected from one side to the other side, the inflow hole 320 may be provided at the lower end of one side of the depressed portion 340, and the outflow hole 330 may be provided at the lower end of the other side of the depressed portion 340. The refrigerant is first inflowed between the bottom portion 210a and the depressed portion 340 through the inflow hole 320 from a pack refrigerant supply pipe to be described later, and the inflowed refrigerant moves along the depressed portion 340 and then may be outflowed to the pack refrigerant discharge pipe through the outflow hole 330. As the refrigerant moves from one side of the depressed portion 340 formed over the entire area of the bottom portion 210a to the other side, the efficient cooling of the entire area of the battery cell stack 120 may be achieved.

On the other hand, again referring to FIG. 4, a cell barrier 350 may be formed on the depressed portion 340 of the heat sink 300 according to the present exemplary embodiment. Specifically, the cell barrier 350 has a structure that is formed to be protruded in a direction opposite to the depression direction of the depressed portion 340, and may be continued along the depressed portion 340. In the case of a large area battery module in which the number of stacked battery cells is much increased compared to the prior art, such as the battery cell stack 120 according to the present exemplary embodiment, the refrigerant flow path may be formed wider, so that the temperature deviation may be more severe. In a large area battery module, a case in which approximately 32 to 48 battery cells 110 are stacked in one battery module may be included in comparison to a case in which approximately 12 to 24 battery cells are stacked in one battery module. In this case, the cell barrier 350 according to the present exemplary embodiment generates an effect of reducing the width of the cooling flow path, thereby minimizing the pressure drop and simultaneously reducing the temperature deviation between the refrigerant flow path widths. Therefore, it is possible to implement a uniform cooling effect.

Hereinafter, the structure of the welding part and the mounting structure of the heat sink is described in detail with reference to FIG. 8.

Figure 8:
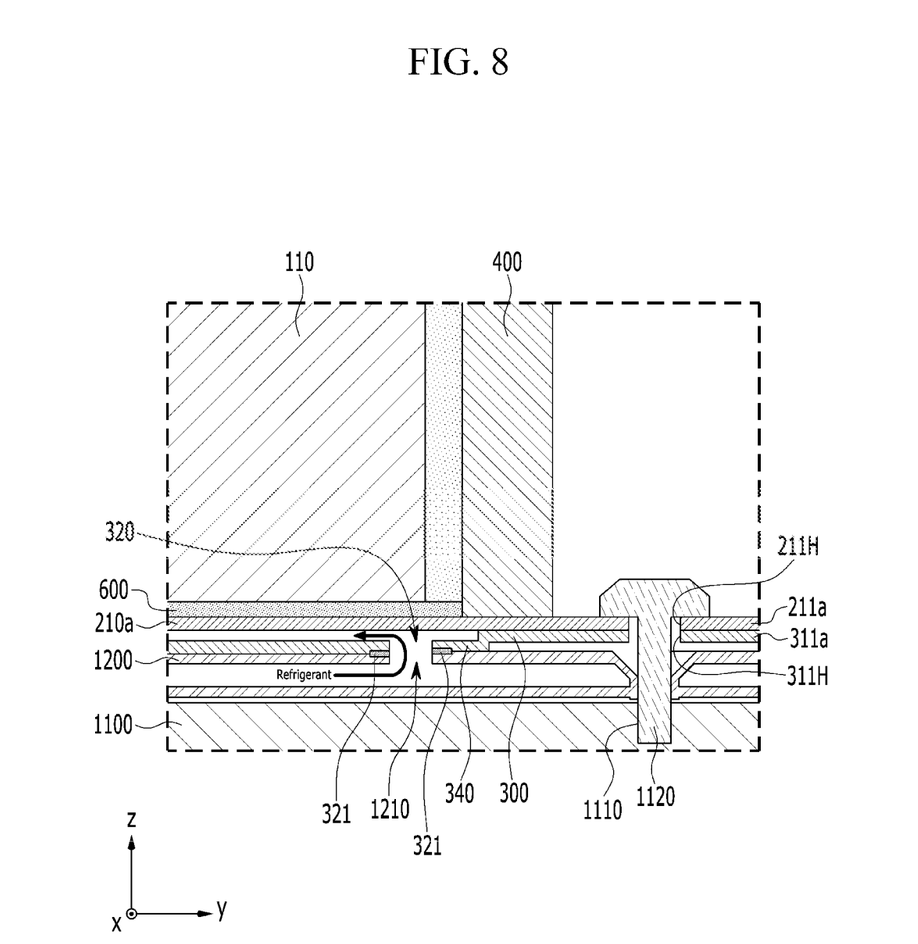
FIG. 8 is a cross-sectional view taken along a cutting line 8-8 in FIG. 7.

FIG. 8 is a cross-sectional view taken along a cutting line 8-8 in FIG. 7. However, for convenience of explanation, FIG. 8 further shows a pack refrigerant supply tube and a pack frame positioned below the battery module.

Referring to FIG. 4, FIG. 5, FIG. 6, and FIG. 8, the module frame 200 according to the present exemplary embodiment includes a first module frame protruded part 211a and a second module frame protruded part 211b formed while the bottom portion 210a of the module frame 200 is partially protruded so as to pass through the end plate 400, and the first module frame protruded part 211a and the second module frame protruded part 211b are positioned to be spaced apart from each other. In more detail, the first module frame protruded part 211a and the second module frame protruded part 211b may be positioned at both ends of one corner of the bottom portion 210a, respectively.

The heat sink 300 may include a first heat sink protruded part 311a and a second heat sink protruded part 311b respectively protruded from one side of the heat sink 300 to the portions in which the first module frame protruded part 211a and the second module frame protruded part 211b are positioned.

In this case, the battery module 100 according to the present exemplary embodiment, as shown in FIG. 5, includes a welding part 500 where the end plate 400 and the module frame 200 are welded and combined, and the welding part 500 is positioned between the first module frame protruded part 211a and the second module frame protruded part 211b. More specifically, two mounting portions 410 may be positioned between the first module frame protruded part 211a and the second module frame protruded part 211b, and the welding part may be positioned between two mounting portions 410. In addition, the welding part 500 may be formed in a place where the lower edge of the end plate 400 and the bottom portion 210a of the module frame 200 are in contact with each other.

As described above, the battery module 100 according to the present exemplary embodiment may be a large area module with a longer horizontal direction length, and as the length increases, the middle part of the horizontal direction length is bound to be structurally weak to vibration or external impact.

Therefore, according to the present exemplary embodiment, rigidity of the battery module 100 may be increased and structural safety may be increased by providing the welding part 500 to the structurally weak parts without disposing the first module frame protruded part 211a and the second module frame protruded part 211 on the structurally weak parts.

Meanwhile, a module frame mounting hole 211H may be formed in the first module frame protruded part 211a and the second module frame protruded part 211b, and a heat sink mounting hole 311H may be formed in the first heat sink protruded part 311a and the second heat sink protruded part 311b.

There is no particular limitation on the number of the module frame mounting holes 211H and the heat sink mounting holes 311H, but it is preferable that the number of the module frame mounting holes 211H and the number of the heat sink mounting holes 311H are the same, and it is more preferable to position the module frame mounting holes 211H and the heat sink mounting holes 311H to correspond to each other. For example, FIG. 5 shows that four module frame mounting holes 211H and four heat sink mounting holes 311H are positioned to correspond to each other.

Referring to FIG. 8, the battery module 100 may be mounted on the pack frame 1100 to form the battery pack. At this time, the pack refrigerant supply tube 1200 may be positioned between the battery module 100 and the pack frame 1100.

The pack refrigerant supply tube 1200 is a configuration for supplying the refrigerant to the battery module, and an opening 1210 for the refrigerant supply may be formed. The inflow hole 320 of the heat sink 300 described above may be positioned so as to correspond to the opening 1210 for the refrigerant supply and they may be connected to each other. Accordingly, the refrigerant moving along the pack refrigerant supply tube 1200 may be inflowed between the heat sink 300 and the bottom portion 210a through the opening 1210 for the refrigerant supply and the inflow hole 320.

In addition, although not specifically shown, a pack refrigerant discharge pipe (not shown) in which an opening (not shown) for refrigerant discharge is formed between the battery module 100 and the pack frame 1100 may be positioned. The outflow hole 330 of the heat sink 300 described above may be positioned to correspond to the opening for discharging the refrigerant and they may be connected to each other. The refrigerant that has moved along the depressed portion 340 may be discharged to the pack refrigerant discharge tube through the outflow hole 330 and the opening for discharging the refrigerant.

Meanwhile, in the pack frame 1100, a fastening hole 1110 corresponding to the module frame mounting hole 211H and the heat sink mounting hole 311H may be formed, and a mounting bolt 1120 may pass through the module frame mounting hole 211H and the heat sink mounting hole 311H to be coupled to the fastening hole 1110. At this time, the pack refrigerant supply tube 1200 may be designed to pass by avoiding the mounting bolt 1120 on the pack frame 1100.

The module frame 200 and the heat sink 300 may be fixed to the pack frame 1100 through the mounting bolt 1120. In addition, by the fastening force of the mounting bolt 1120, the bottom portion 210a, the heat sink 300, and the pack refrigerant supply tube 1200 are strongly adhered to each other, so a sealing property is improved and a possibility of refrigerant leakage therebetween may be reduced. Particularly, since the inflow hole 320 and the outflow hole 330 may be positioned adjacent to the first heat sink protruded part 311a and the second heat sink protruded part 311b, respectively, leakage of the refrigerant from the inflow hole 320 and the outflow hole 330 may be effectively blocked.

Meanwhile, at least one of the inflow hole 320 and the outflow hole 330 may include a sealing member 321 surrounding the exterior circumference thereof. The sealing member 321 may be positioned below the heat sink 300, and more specifically, it may be positioned between the heat sink 300 and the pack refrigerant supply tube 1200. Through this sealing member 321, the leakage of the refrigerant may be prevented during the inflow and the discharge of the refrigerant. There is no limitation in the structure of the sealing member 321 according to the present exemplary embodiment, but a member of a gasket type as shown or a member of a valve port may be applied.

In the present exemplary embodiment, terms indicating directions such as before, after, left, right, up, and down have been used, but these terms are only for convenience of explanation, and may vary depending on a position of an object to be targeted or a position of an observer.

One or more battery modules according to the present exemplary embodiment described above may be mounted together with various control and protection systems such as a battery management system (BMS) and a cooling system to form the battery pack.

The battery module or the battery pack may be applied to various devices. Specifically, it may be applied to transportation means such as electric bicycles, electric vehicles, hybrids, etc., but is not limited thereto, and may be applied to various devices that may use a rechargeable battery.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

100: battery module
200: module frame
210a: bottom portion
211a: first module frame protruded part
211b: second module frame protruded part
300: heat sink
311a: first heat sink protruded part
311b: second heat sink protruded part
500: welding part

The invention claimed is:

1. A battery module comprising:
a battery cell stack in which a plurality of battery cells are stacked;
a module frame accommodating the battery cell stack;
an end plate positioned on a front surface and a rear surface of the battery cell stack; and
a heat sink positioned under a bottom portion of the module frame,
wherein the bottom portion of the module frame constitutes an upper plate of the heat sink,
wherein the module frame includes a first module frame protruded part and a second module frame protruded part extending from the bottom portion of the module frame,
wherein the first module frame protruded part and the second module frame protruded part are positioned spaced apart from each other,
wherein a welding part where the end plate and the module frame are welded is positioned between the first module frame protruded part and the second module frame protruded part,
wherein the welding part is formed where the lower edge of the end plate and the bottom portion are in contact, and
wherein the welding part does not overlap the heat sink.

2. The battery module of claim 1, wherein the heat sink includes a first heat sink protruded part and a second heat sink protruded part extending from the heat sink and respectively overlapping the first module frame protruded part and the second module frame protruded part.

3. The battery module of claim 2, wherein a module frame mounting hole is formed in each of the first module frame protruded part and the second module frame protruded part.

4. The battery module of claim 3, wherein a heat sink mounting hole is formed in each of the first heat sink protruded part and the second heat sink protruded part.

5. The battery module of claim 4, wherein the module frame mounting hole and the heat sink mounting hole are positioned to correspond to each other.

6. The battery module of claim 1, wherein the heat sink and the bottom portion form a flow path of a refrigerant, and
wherein the bottom portion is in contact with the refrigerant.

7. The battery module of claim 1, wherein the heat sink includes an inflow hole for inflow of the refrigerant and an outflow hole for exhaust of the refrigerant.

8. The battery module of claim 1, wherein the heat sink includes a lower plate joined with the bottom portion and a depressed portion depressed into the lower side.

9. A battery pack comprising the battery module of claim 1.

10. The battery module of claim 2, wherein the heat sink has a recess between the first heat sink protruded part and the second heat sink protruded part, and
wherein the recess overlaps the welding part.

11. The battery module of claim 2, wherein an inflow hole for inflow of the refrigerant is formed in the first heat sink protruded part and an outflow hole for exhaust of the refrigerant is formed in the second heat sink protruded part.

* * * * *